C. P. LANDRETH.
METHOD OF AND APPARATUS FOR TREATING LIQUID.
APPLICATION FILED DEC. 20, 1916.
1,378,120.
Patented May 17, 1921.
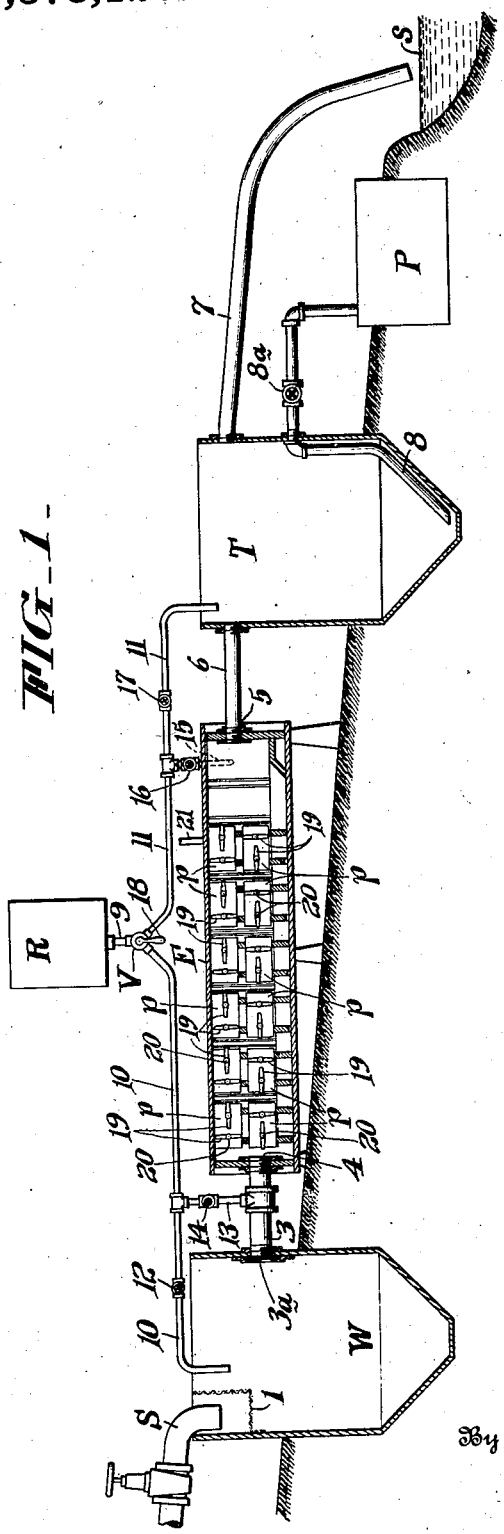
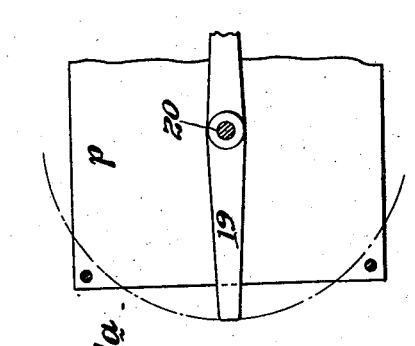
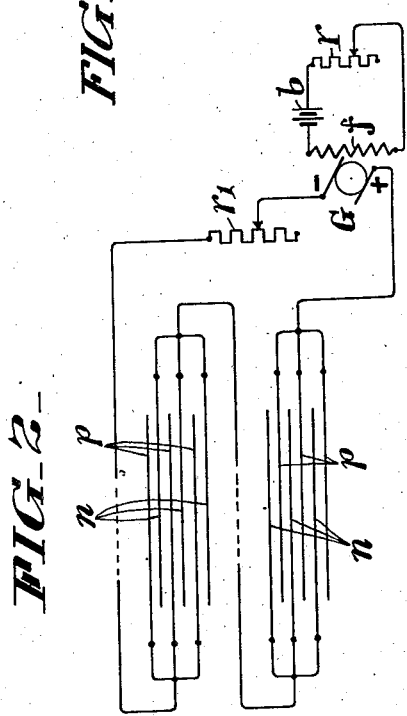
Inventor
Clarence P. Landreth.
By Cornelius D. Ehret
His Attorney

UNITED STATES PATENT OFFICE.

CLARENCE P. LANDRETH, OF PHILADELPHIA, PENNSYLVANIA.

METHOD OF AND APPARATUS FOR TREATING LIQUID.

1,378,120.  Specification of Letters Patent.  Patented May 17, 1921.

Application filed December 20, 1916. Serial No. 138,087.

*To all whom it may concern:*

Be it known that I, CLARENCE P. LANDRETH, a citizen of the United States, residing in the city of Philadelphia, county of Philadelphia, and State of Pennsylvania, have invented certain new and useful Improvements in Methods of and Apparatus for Treating Liquid, of which the following is a specification.

My invention relates to the electro-chemical treatment of waters, in general for drinking and industrial purposes, sewage, factory waste, effluent from tanneries and slaughter houses, and in fact liquids in general for the purpose of purifying the same or for producing therein desired bacterial, chemical or physical changes, or all of them.

My invention resides in a process or method of electro-chemically treating liquids of the character above referred to in the presence of electrodes, especially positive electrodes, of metal such as iron or steel, by so operating that passivity of the electrodes may be taken advantage of and induced at will, and by applying or discontinuing application of reagent, or varying the point or region of application of the reagent.

In accordance with my invention, a suitable material or reagent, as milk of lime, calcium hydroxid, or other hydroxid, or other suitable reagent or material, is introduced into the liquid to be treated so that the same shall be present therein during its electrical treatment, which causes the positive electrodes of iron, steel or other suitable material to become passive, that is, to assume a condition at their surfaces, as when exposed to the action of oxidizing agents or subjected to conditions inducing oxidation, that their surfaces become more noble, that is, less easily soluble or less easily wasted by electrolytic action, or, in a sense, become more like unattackable electrodes. When the electrode or electrode surface so becomes passive, and a reagent is introduced into the liquid prior to or during electrical treatment, and is of such nature as to react with contents of the liquid to produce a precipitate, such precipitate may lodge or collect upon the electrode surface. In such case the introduction of reagent prior to or during electrical treatment may be discontinued or reduced in quantity to such extent that the passivity of the electrode gradually diminishes or disappears; and simultaneously, if the liquid treated is of suitable character, such reaction will take place with the precipitate coating as to dissolve or remove the same. The reagent may then be again introduced prior to or during electrical treatment, or again increased in quantity so as to again cause or induce passivity of the electrodes, and then again discontinued or diminished in quantity until the passivity again diminishes or disappears.

The reagent may also be introduced into the liquid after it has received its electrical treatment, and either simultaneously with the introduction of reagent prior to or during electrical treatment, or, preferably, alternately, that is, first introduced prior to or during electrical treatment until passivity of electrodes is attained, and then discontinued and introduced into the liquid after it has received its electrical treatment.

As an illustrative example of application of my process the treatment of sewage may be considered. In this case milk of lime is introduced into the sewage prior to or during electrical treatment, and preferably in such quantity as to cause free alkali in the liquid. Under these circumstances nascent oxygen will be produced for oxidizing contents of the sewage, and the positive electrode plates of iron or steel will become passive. Simultaneously the milk of lime will react upon contents of the sewage and produce a precipitate, generally calcium carbonate, which, while the electrodes are passive, will collect on the surface thereof and so in a sense increase the resistance of the electrical circuit or circuits and will also increase the resistance offered to the paddles, if employed. The operator of the apparatus will know, with such degree of certainty at least as required in practice, when the electrodes are passive by noting the increased power, as indicated by a wattmeter in circuit with the electric motor driving the paddles, required to drive the paddles. He may then discontinue or reduce the quantity of reagent introduced prior to or during the electrical treatment and introduce the milk of lime into the sewage after it has received its electrical treatment. Contents of the sewage, such as materials supplying acid ions, will not only react with and cause solution or removal of the calcium carbonate precipitate upon the electrode plates, but will also act upon the positive iron electrode and diminish or completely remove its passivity, in which state the electrode will waste under electrolytic action unless the passivity is again produced. The operator may know when the precipitate has been removed and thereby know that it is soon time to reproduce the conditions suitable for inducing passivity, by noting the reduction in power required for driving the paddles. In such case he again introduces the milk of lime into the sewage before or during electrical treatment, and will preferably discontinue its introduction into the sewage after it has received its electrical treatment. And so the action is carried on alternately, the passivity of the electrodes preventing their waste, and during such passivity the amount of milk of lime used, particularly the amount introduced prior to or during electrical treatment, may be greatly reduced and so in the end effect a saving in amount of total reagent employed.

Where the reagent is introduced after electrical treatment, as explained in Letters Patent hereinafter referred to, the milk of lime reacts with contents of the sewage to produce a precipitate which acts as a coagulent or sedimentizing agent for causing rapid settling out of the liquid of the solids and semi-solids. And in case the milk of lime is introduced in such quantity as to leave in the effluent free alkali, a condition is established which maintains the effluent stable as respects bacterial action.

While in a passive or semi-passive condition the products of electrolysis at the positive electrode are oxygen and only a small proportion of the compounds or salts of the electrode metal; and these compounds or salts of the electrode metal are sparingly formed particularly in the case where the quantity of the reagent employed and the voltage of the current are properly regulated.

It is a further feature of my invention when using electrodes of the character referred to to render them passive, irrespective of the nature of the liquid treated and the nature of the treatment, as by introducing a suitable reagent to cause liberation of nascent oxygen which may in part be occluded by the metal electrode and which may also chemically react with the electrode metal to form an oxid coating, particularly when the electrode is of iron or steel.

For an understanding of my invention reference may be had to the accompanying drawing, in which:

Figure 1 is a general view of apparatus, partly in vertical section and partly in elevation, whereby my process may be carried out.

Fig. 1ª is a fragmentary elevational view illustrating the projection of a paddle beyond the end or edge of an electrode plate for prevention of clogging.

Fig. 2 is a diagrammatic view illustrating a circuit arrangement which may be used for the electrolyzer.

Referring to Fig. 1, S is the pipe or other conduit which delivers the liquid to be treated, as water, sewage, or the like, to the receiving tank or well W serving as a preliminary settling tank in which mud, sand or objects carried by the received liquid settle out by gravity, a preliminary screen 1 serving to catch large objects. Connecting with the well W, preferably at a substantial distance above its bottom, is a pipe 3, across whose opening into the well W may be placed a strainer 3ª for coarsely straining the liquid to prevent any large objects passing into the electrolyzer or electrolytic treating apparatus E with which the pipe 3 connects at 4. The liquid passes through the electrolytic treating apparatus E and leaves it at 5 through the pipe 6 which may deliver into the settling tank T, in which suspended matter, such as sludge, coagulant and other matter in suspension in the treated liquid may settle and collect at the bottom, the substantially clear liquid or effluent passing out from near the top of tank T and through the pipe 7 to waste, such as a stream $s$, or if it is so desired, the pipe 7 may conduct it to the point of its utilization or to a filter.

From the bottom of the tank T the pipe 8, controlled by valve 8ª, serves to withdraw the sediment or sludge from the tank T into the apparatus P which may be a filter press, or any other suitable sediment or sludge drying apparatus, that is, apparatus for extracting liquid from the sediment or sludge; or P may represent any suitable filter beds or any other means for separating liquids from solids, if such are required.

R is a reagent tank, containing any suitable chemical to be introduced into the liquid, such for example, as milk of lime or calcium hydroxid, sodium hydroxid, or any other hydroxid, or any reagent suitable for the purpose. The chemical solution passes from the tank R through the pipe 9 to the valve V with which connect the pipes 10 and 11.

The reagent in solution or suspension in liquid in the tank R may be delivered through the pipe 10 through the valve 12 into the receiving tank or well W or through the branch pipe 13 controlled by valve 14 into the liquid or sewage as it enters the electrolyzer E. The valves 12 and 14 may be closed or opened at will so that reagent may be delivered simultaneously into well W and into the electrolyzer E, or into either only.

Or reagent may be delivered from the tank R through the valve V and thence through the pipe 11 and thence through the branch pipe 15 controlled by valve 16 into the electrolyzer tank or box or through the valve 17 into the tank T, as may be desired.

By shifting the handle 18 of the valve V the reagent from the tank R may be directed at will either into the pipe 10 or the pipe 11, or may take some intermediate position in which reagent flows simultaneously through the pipes 10 and 11 in any desired proportion.

The liquid to be treated passes as stated into the electrolyzer E at 4 and in its course through the electrolyzer E passes between the electrode plates, of which the positive electrodes $p$ are visible in Fig. 1. The negative electrodes $n$, Fig. 2, are disposed parallel to and side by side with the electrode plates $p$, and between them are disposed the paddles 19 rotated by shafts 20 which are in turn driven by any suitable source of power, as for example, an electric motor, the use of the paddles being more intimately to contact the liquid treated in a given length of time.

The electrodes, of iron, steel or other suitable metal, are arranged in groups or banks of any suitable number per group or bank, and any suitable number of groups or banks may be employed, and the groups or banks may be connected in series with each other, as illustrated in Fig. 2, or may be connected in any other suitable arrangement, as in series parallel, etc. In circuit with the electrodes may be connected an adjustable resistance $r^1$ and a source of direct current, as a dynamo electric generator G, having the field winding $f$ energized from any suitable source of current, as from the armature of the generator G or from a separate source $b$, the field current strength being adjustable by the adjustable resistance $r$. By adjusting the resistance $r$, or the resistance $r^1$, or both of them, the voltage and ampere flow of current through the liquid between the electrodes may be adjusted to any suitable or desired value; and the desired voltage impressed upon the electrodes may thus be adjusted by means of the resistance $r$.

The electrolyzer herein described may be of the structure illustrated and described in my prior Patents No. 1,139,778, May 18, 1915, No. 1,186,106, June 6, 1916 or No. 1,201,202, October 10, 1916, though it is to be understood that any other suitable type or form of electrolyzer may be employed; and it will be further understood that my invention is not limited to the employment of paddles in the electrolyzer, though their use is preferred.

To prevent clogging of the electrodes where the liquid enters between the electrode plates, the paddles are so arranged and proportioned as to length that they sweep past and beyond the ends of the electrode plates, thereby maintaining a free passage for the liquid between the plates.

For this purpose the structure may be such as illustrated in Fig. 1ª, where $p$ represents a part of an electrode plate, and the paddle 19, rotating upon an axis at 20, sweeps beyond the end of the plate $p$, the end of the paddle taking the arcuate path indicated by the dotted line.

For discharge of gases generated within the electrolyzer E there may be provided one or more vent pipes 21 in the cover of the electrolyzer.

When treating liquid, as waters, sewage, slaughter house or tannery effluent, etc., containing oxidizable matter either in suspension or solution, the reagent may be milk of lime or calcium hydroxid, or any other suitable hydroxid, which may be introduced first through the pipe 10 until the electrodes become coated, or complete or partial passivity of the metal electrodes, especially the positive electrodes, and particularly when of iron or steel, occurs or is induced; and when, due to the nature of the reagent used, there is an accumulation of precipitate upon the surfaces of the electrodes which seriously diminishes liquid flow between them. This may cause substantial opposition to the rotation of the paddles, requiring more power for their operation, which may be indicated by a watt meter or any other suitable instrument in the circuit of or associated with the electric motor which drives the paddles.

When such condition obtains the valve V is turned to such position that introduction of reagent through the pipe 10 is either reduced or entirely stopped, and reagent directed through the pipe 11 for introduction into the liquid after its passage between the electrodes.

The character and quantity of reagent so introduced through the pipe 10 may be anything suitable or desirable and may be, for example, such as described and claimed in Letters Patent No. 1,139,778 granted me May 18, 1915. And the character and quantity of the reagent introduced through the pipe 11 may be anything suitable or desirable, and may be such as described and claimed in my co-pending application Serial Number 43,909, filed August 6, 1915, but this method permits the use of lesser quantities when desired.

It will be understood that it is not necessary to introduce hydroxid into the liquid to produce passivity of the electrodes in such quantity as to cause free alkali to exist in the liquid before or during electrical treatment, though addition of hydroxid to the extent of causing free alkali before or during electrical treatment is comprehended within my invention. Where the aforesaid free alkali condition does not obtain, the amount of lime or other reagent introduced is less than in the case where the free alkali condition is produced. And by the introduction of the lime or other reagent into the liquid after it has passed the electrodes or has received the electrical treatment, less of it is required than in the case where the free alkali condition obtains. The introduction of lime or other reagent after electrical treatment serves not only in producing beneficial effects upon the effluent, but also causes the formation of coagulant, as by reaction with carbon dioxid or carbonates in the solution, or other materials in solution, to form a coagulant for sedimentation purposes.

And when treating waters and the like for the removal of temporary or permanent hardness, or both, the reagents employed may be of such character and in such quantity as may be suitable or desirable, or such as described in my aforesaid application Serial Number 43,909.

And whatever the nature of the treatment and reagent used therefor the reagent is introduced first prior to or during the electrical treatment and then after reducing or stopping the introduction of reagent prior or during the electrical treatment it is introduced into the liquid subsequent to its passage between the electrodes.

It will be understood, also, that where different reagents are used for different purposes, a plurality of reagent tanks R may be employed, and the reagent from one of them introduced into the liquid prior or during electrical treatment, preferably until the aforementioned passivity is induced or occurs, and then discontinued in part or completely and the other reagent introduced into the liquid after it has received electrical treatment. And in this connection it will be understood that the reagent introduced prior to or during the electrical treatment may be such as will cause or induce passivity of the electrodes as by causing the liberation of oxygen as by secondary reaction caused by the OH ions or by the CO or other ions, without regard to whether or not it reacts upon or causes reaction upon any content of the liquid.

Or the liquid to be treated may itself have such content or contents that upon passage of electric current therethrough the passivity of the electrodes will be induced without introduction of reagent for that purpose prior to or during the electrical treatment, the strength of the current and its voltage being suitably adjusted for the purpose, as for the decomposition of urea in the sewage, etc.; then the reagent may be introduced after the electrical treatment, as through the pipe 11 only, in which case the current strength and voltage may be adjusted to new values, if necessary or desirable.

What I claim is:

1. The method of treating liquid, which consists in passing current through the same in the presence of a normally attackable positive electrode, rendering said electrode passive, continuing passage of current through the liquid in the presence of said passive electrode, and introducing reagent into the liquid after the passage of current therethrough.

2. The method of treating liquid, which consists in passing current therethrough in the presence of a normally attackable positive electrode and in the presence of a reagent added thereto until passivity of said electrode is produced, and introducing a reagent into the liquid after passage of current therethrough.

3. The method of treating liquid, which consists in introducing a reagent thereinto, and electrolyzing the same in the presence of a positive metal electrode until said electrode becomes passive, then reducing or discontinuing the introduction of said reagent, and introducing said reagent into the liquid after passage of current therethrough.

4. The method of treating liquid, which consists in passing current therethrough in the presence of a positive metal electrode, and simultaneously introducing reagent into said liquid both during and after its electrical treatment to render said electrode passive and cause reaction between said reagent and contents of the liquid after passage of current through the liquid.

5. The method of treating liquid, which consists in passing electric current therethrough, and alternately introducing reagent into said liquid prior and subsequent to the electrical treatment.

6. The method of treating liquid, which consists in passing current therethrough in the presence of a normally attackable positive electrode, and alternately introducing into said liquid a hydroxid before electrical treatment and a reagent subsequent to electrical treatment.

7. The method of treating liquid, which consists in passing current therethrough in the presence of a normally attackable positive electrode, and alternately introducing into said liquid a hydroxid prior and subsequent to electrical treatment.

8. The method of treating liquid, which consists in passing current through the same in the presence of a normally attackable positive electrode, introducing into said liquid a reagent producing an electro-chemical effect which causes passivity of said electrode, and discontinuing or reducing the quantity of said reagent until the passivity of said electrode is diminished or disappears.

9. The method of treating liquid, which consists in passing current through the same in the presence of a normally attackable positive electrode, introducing into said liquid a reagent producing an electro-chemical effect which causes passivity of said electrode and reacts with contents of said liquid, and discontinuing or reducing the quantity of said reagent until the passivity of said electrode is diminished or disappears.

10. The method of treating liquid, which consists in passing current through the same in the presence of a normally attackable positive electrode, introducing into said liquid a reagent producing an electro-chemical effect which causes passivity of said electrode, discontinuing or reducing the quantity of said reagent until the passivity of said electrode is diminished or disappears, and introducing into said liquid after passage of current therethrough a material reacting with contents thereof to produce a coagulant.

11. The method of treating liquid, which consists in passing current through the same in the presence of a normally attackable positive electrode, introducing into said liquid a reagent producing an electro-chemical effect which causes passivity of said electrode and reacts with contents of said liquid, discontinuing or reducing the quantity of said reagent until the passivity of said electrode is diminished or disappears, and during passivity of said electrode introducing said reagent into said liquid after passage of current therethrough.

12. The method of treating liquid, which consists in passing current therethrough in the presence of a normally attackable positive electrode, and alternately introducing into said liquid before or during electrical treatment and after electrical treatment a reagent of such character as to cause an electro-chemical effect inducing passivity of said electrode.

13. The method of treating liquid, which consists in passing current therethrough in the presence of a normally attackable positive electrode, and alternately introducing into said liquid before or during electrical treatment and after electrical treatment a reagent of such character as to cause an electro-chemical effect inducing passivity of said electrode and reacting with contents of said liquid.

14. The method of treating liquid, which consists in passing current therethrough in the presence of a normally attackable positive electrode, alternately changing the amount of a reagent introduced into said liquid before or during electrical treatment and after electrical treatment, said reagent producing an electro-chemical effect inducing passivity of said electrode when introduced before or during the electrical treatment and reacting with contents of said liquid when introduced subsequent to said electrical treatment.

15. The method of treating liquid, as sewage, containing oxidizable material, which consists in passing current therethrough in the presence of a normally attackable positive electrode in the presence of a reagent added thereto in such quantity as to cause production of nascent oxygen and inducing passivity of said electrode, continuing the production of oxygen during passivity of said electrode during reduction or discontinuance of application of said reagent, and thereafter introducing or increasing the quantity of said reagent to restore or increase the passivity of said electrode.

16. The method of treating liquid, as sewage, containing oxidizable material, which consists in passing current therethrough in the presence of a normally attackable positive electrode in the presence of a reagent added thereto in such quantity as to cause production of nascent oxygen and inducing passivity of said electrode, continuing the production of oxygen during passivity of said electrode during reduction or discontinuance of application of said reagent, thereafter introducing or increasing the quantity of said reagent to restore or increase the passivity of said electrode, and introducing into said liquid after it has received the aforesaid electrical treatment a reagent reacting with contents thereof.

17. The method of treating liquid, as sewage, containing oxidizable material, which consists in passing current therethrough in the presence of a normally attackable positive electrode in the presence of a reagent added thereto in such quantity as to cause production of nascent oxygen and inducing passivity of said electrode, continuing the production of oxygen during passivity of said electrode during reduction or discontinuance of application of said reagent, thereafter introducing or increasing the quantity of said reagent to restore or increase the passivity of said electrode, and introducing said reagent into said liquid after it has received the aforesaid electrical treatment during passivity of said electrode.

18. The method of treating liquid, as sewage, containing oxidizable material, which consists in passing current therethrough in the presence of a normally attackable positive electrode in the presence of a hydroxid, as milk of lime, added thereto in such quantity as to cause production of nascent oxygen and to induce passivity of said electrode, continuing the production of oxygen during passivity of said electrode during reduction or discontinuance of application of said hydroxid, and thereafter introducing or increasing the quantity of said hydroxid to restore or increase the passivity of said electrode.

19. The method of treating liquid, as sewage, containing oxidizable material, which consists in passing current therethrough in the presence of a normally attackable positive electrode in the presence of a hydroxid, as milk of lime, added thereto in such quantity as to cause production of nascent oxygen and to induce passivity of said electrode, continuing the production of oxygen during passivity of said electrode during reduction or discontinuance of application of said hydroxid, and thereafter introducing or increasing the quantity of said hydroxid to restore or increase the passivity of said electrode, said hydroxid being added in such quantity as to insure free alkali in the effluent.

20. The method of treating liquid, as sewage, containing oxidizable material, which consists in passing current therethrough in the presence of a normally attackable positive electrode in the presence of a hydroxid, as milk of lime, added thereto in such quantity as to cause production of nascent oxygen and to induce passivity of said electrode, continuing the production of oxygen during passivity of said electrode during reduction or discontinuance of application of said hydroxid, thereafter introducing or increasing the quantity of said hydroxid to restore or increase the passivity of said electrode, and during passivity of said electrode introducing a hydroxid, as milk of lime, into said liquid after it has received the aforesaid electrical treatment.

21. The method of treating liquid, as sewage, containing oxidizable material, which consists in passing current therethrough in the presence of a normally attackable positive electrode in the presence of a hydroxid as milk of lime, added thereto in such quantity as to cause production of nascent oxygen and to induce passivity of said electrode, continuing the production of oxygen during passivity of said electrode during reduction or discontinuance of application of said hydroxid, thereafter introducing or increasing the quantity of said hydroxid to restore or increase the passivity of said electrode, and during passivity of said electrode introducing a hydroxid, as milk of lime, into said liquid after it has received the aforesaid electrical treatment, the total hydroxid introduced into said liquid causing reaction with contents thereof to produce a coagulant and leaving in the effluent free alkali.

In testimony whereof I have hereunto affixed my signature this 15 day of December, 1916.

CLARENCE P. LANDRETH.